United States Patent [19]

Kawai

[11] Patent Number: 5,790,483
[45] Date of Patent: Aug. 4, 1998

[54] MAGNETO-OPTICAL DISK DRIVE DEVICE THAT WRITES AND READS FROM TWO SIDES OF A DISK

[75] Inventor: Toshihiko Kawai, Fukaya, Japan

[73] Assignee: Nikon Corporation, Tokyo, Japan

[21] Appl. No.: 555,841

[22] Filed: Nov. 13, 1995

[30] Foreign Application Priority Data

Nov. 24, 1994 [JP] Japan .................................. 6-288494
Jun. 2, 1995 [JP] Japan .................................. 7-136778

[51] Int. Cl.$^6$ .................................................. G11B 11/00
[52] U.S. Cl. ............................... 369/13; 360/59; 360/114
[58] Field of Search .................................. 369/13, 288, 14, 369/32, 111, 100, 110, 44.14, 44.38, 44.39, 44.26; 360/59, 114

[56] References Cited

U.S. PATENT DOCUMENTS

| | | | |
|---|---|---|---|
| 4,788,671 | 11/1988 | Kanda | 369/13 |
| 4,802,021 | 1/1989 | Makagawa et al. | 369/13 X |
| 5,148,416 | 9/1992 | Hoshino et al. | 369/13 X |
| 5,481,508 | 1/1996 | Watanabe et al. | 369/13 |

*Primary Examiner*—Ali Neyzari
*Attorney, Agent, or Firm*—Oliff & Berridge, PLC

[57] ABSTRACT

A disk drive device is provided to realize a simultaneous dual side access to thus increase the online capacity. Two independent focussed light emitting devices focus light on first and second sides of a magneto-optical disk. Magnetic generating devices are provided in correspondence with the respective focussed light emitting devices. The focussed light emitting devices move in a radial direction or substantially radial direction relative to the disk.

18 Claims, 9 Drawing Sheets

MAGNETO-OPTICAL DISK DRIVE DEVICE THAT WRITES AND READS FROM TWO SIDES OF A DISK

BACKGROUND OF THE INVENTION

1. Field of the Invention

The present invention relates to a magneto-optical disk drive device that writes and reads from two sides of a disk.

2. Description of Related Art

Magneto-optical disk drive devices write and read data by irradiating a very small, focussed laser light spot while causing a data-recording medium such as a disk to rotate.

Reading methods include reflection types and transillumination types. Transillumination types are methods where the laser light transilluminates the disk. Presently, reflection types are more common because of the ease in boosting precision and the ability to make the disk drives more compact.

Figure 7A:
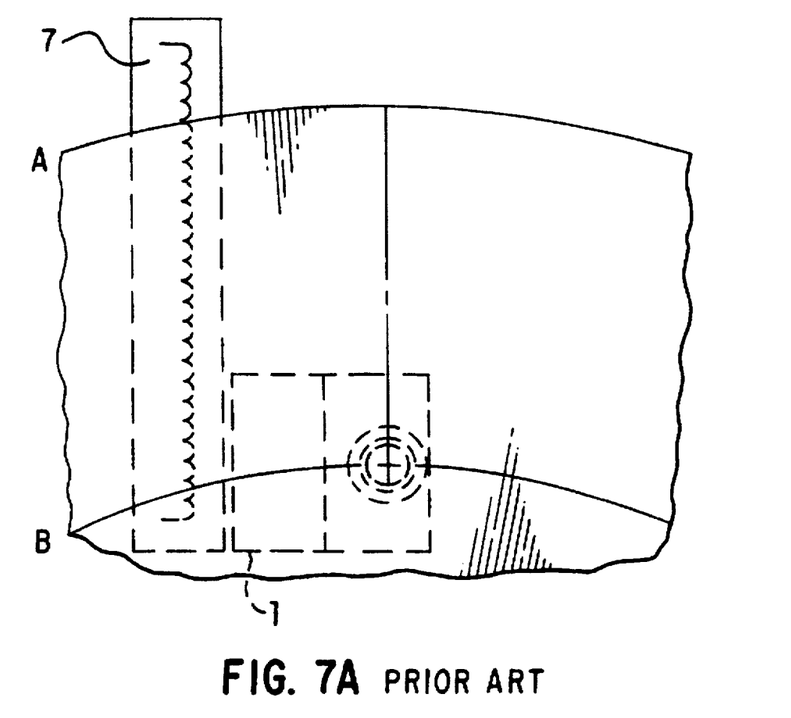
FIG. 7 is a vertical cross section of a conventional magneto-optical disk drive device.
Figure 7B:
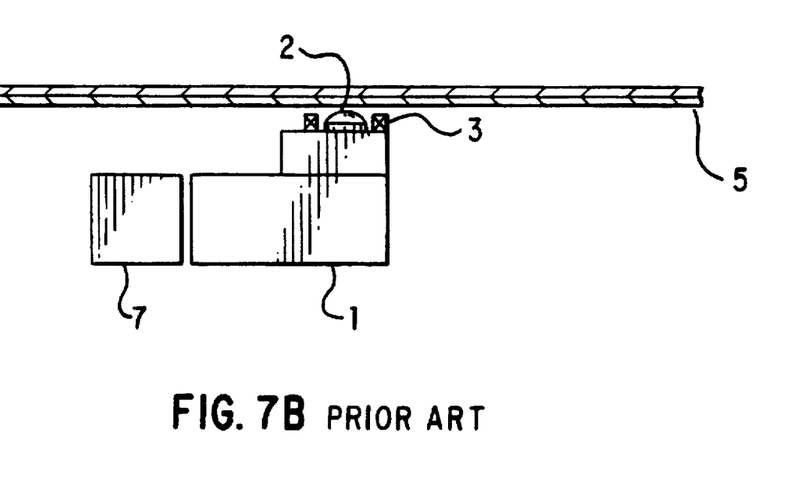

FIG. 7 shows an example of one type of a conventional magneto-optical disk drive device. This device includes a focussed light emitting device 2 that focuses on the magneto-optical layer 5 of a magneto-optical disk. An optical system 1 guides light rays emitted from the light source to the focussed light emitting device 2. A magnetic field generating device 3 causes the perpendicular magnetism of the magneto-optical disk to be reversed. A movement device 7 moves the focussed light emitting device 2 in a radial direction relative to the magneto-optical disk from an outer radius A to an inner radius B. The focussed light emitting device 2 and the magnetic field generating device 3 are positioned on the same side of the magneto-optical disk.

The magneto-optical disk drive device offers the benefits that the memory capacity of the magneto-optical disk is relatively large and the magneto-optical disk is rewritable and removable. However, in recent years there has been a growing demand for further increases in the online capacity (the capacity of the data that can be written and read without ejecting a disk after inserting the disk into the disk drive device).

SUMMARY OF THE INVENTION

It is an object to provide a magnetic-optical disk drive device that can write and read simultaneously from both sides of a disk (a magneto-optical disk) to increase the online capacity.

The present invention includes first and second focussed light emitting devices that cause light to focus on first and second sides (A side and B side) of an magneto-optical disk. First and second movement devices move the first and second focussed light emitting devices in a radial direction relative to the magneto-optical disk. First and second magnetic field generating devices cause the perpendicular magnetism of the magneto-optical disk to be reversed. The first and second focussed light emitting devices are positioned such that first and second optical spots that are emitted from the first and second focussed light emitting devices focus in offset positions on the first and second sides of the disk.

Furthermore, the magneto-optical disk drive device writes and reads from a disk housed in a cartridge. The disk housed in the cartridge has first and second windows provided for receiving the first and second focussed light emitting devices.

Offsetting of the first and second optical spots refers to the first and second optical spots not mutually overlapping on the tracks of the disk.

The first and second focussed light emitting devices may be positioned so the first and second optical spots on the first and second sides are in offset locations. Consequently, it is possible to simultaneously write and record on both the first and second sides because the first and second optical spots do not affect each other.

Thus, it is possible to write and record simultaneously from both sides of a disk to increase the online capacity with certainty.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described in detail with reference to the following drawings wherein like reference numerals refer to like elements and wherein.

DETAILED DESCRIPTION OF PREFERRED EMBODIMENTS

FIRST EMBODIMENT

Figure 1A:
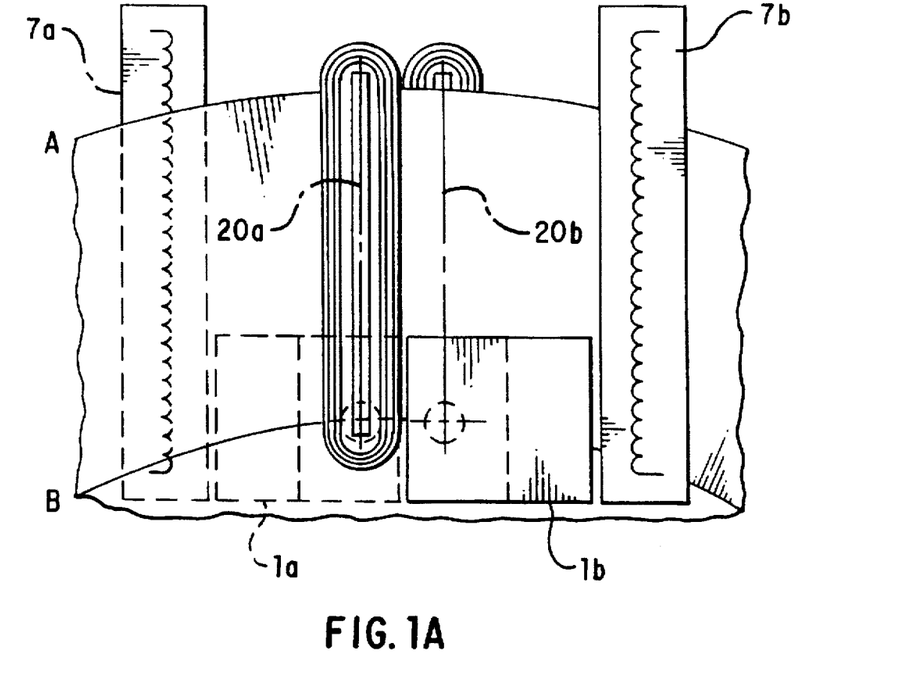
FIG. 1 is a vertical cross section of an magneto-optical disk drive device according to a first embodiment of the present invention.
Figure 1B:
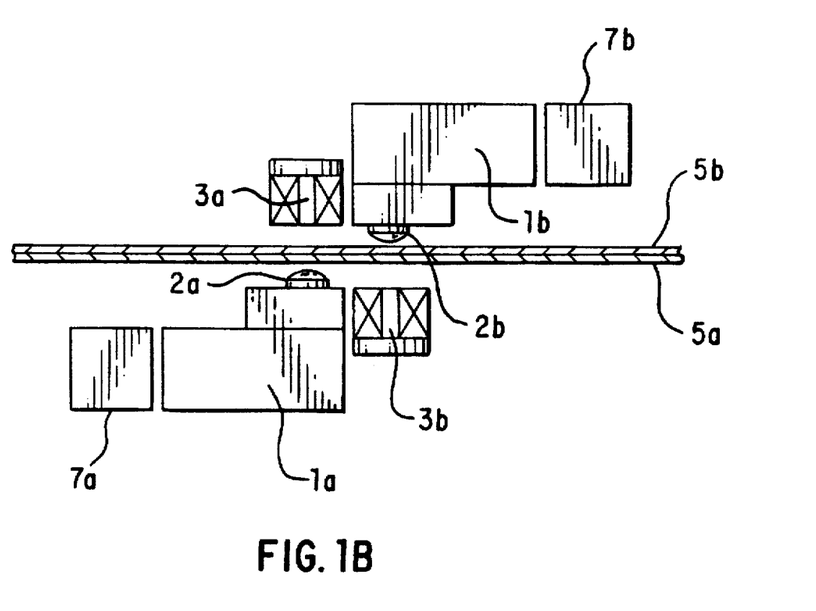

FIG. 1 is a cross-sectional diagram of a magneto-optical disk drive device. In this device, a first optical system 1a and a first focussed light emitting device 2a are positioned on a first side of the data recording surface (i.e., the magneto-optical layer 5a) of the magneto-optical disk. A first magnetic field generating device 3a is positioned on a second side of the magneto-optical disk. Similarly, a second optical system 1b and a second focussed light emitting device 2b are positioned on the second side of the data recording surface (i.e., the magneto-optical layer 5b) of the magneto-optical disk. A second magnetic field generating device 3b is also positioned on the first side. The magnetic field generating devices 3a and 3b are preferably electromagnets.

Movement device 7a moves the first focussed light emitting device 2a on the first side of the disk between the outer

3 radius A and the inner radius B. Likewise, movement device 7b moves the second focussed light emitting device 2b on the second side of the disk between the outer radius A and the inner radius B.

Focussed light is irradiated onto the magneto-optical layer 5a through the focussed light emitting device 2a to accomplish writing and reading on the first magneto-optical layer 5a. Furthermore, during recording the perpendicular magnetism of the magneto-optical disk is reversed by the first magnetic field generating device 3a.

Focussed light is irradiated onto the magneto-optical layer 5b through the focussed light emitting device 2b to accomplish writing and reading on the second magneto-optical layer 5b. Furthermore, during recording the perpendicular magnetism of the magneto-optical disk is reversed by the second magnetic field generating device 3b.

It is possible to conduct writing and recording on the first magneto-optical layer 5a, the second magneto-optical layer 5b or both sides simultaneously.

In order to prevent interference between the first magnetic field and the second magnetic field, an offset is maintained in the movement range of the respective focussed light emitting devices 2a and 2b.

SECOND EMBODIMENT

Figure 2A:
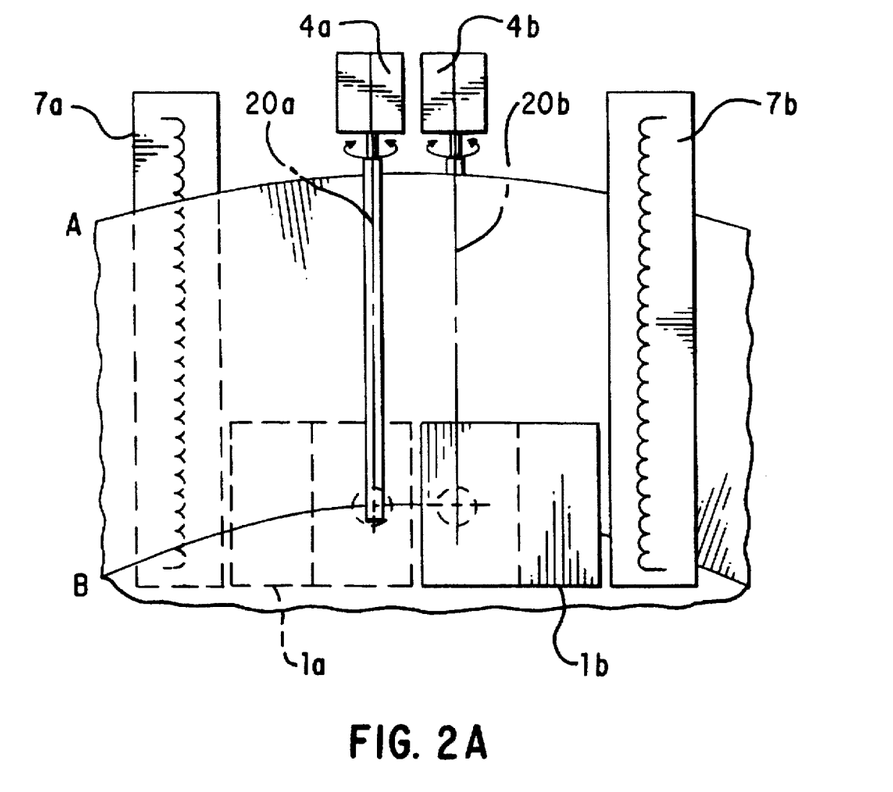
FIG. 2 is a vertical cross section of an magneto-optical disk drive device according to a second embodiment of the present invention.
Figure 2B:
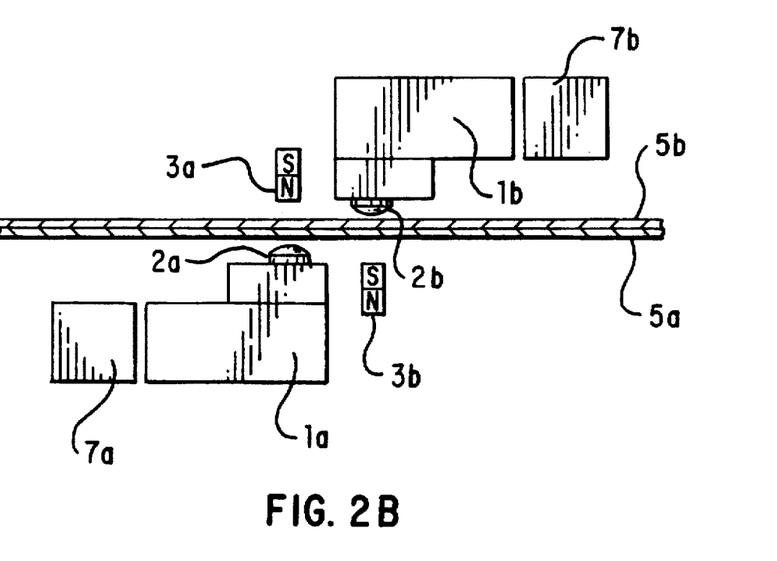

FIG. 2 is a cross-sectional diagram of another magneto-optical disk drive device. In this device, a first optical system 1a and a first focussed light emitting device 2a are positioned on the first side of the data recording surface while a first magnetic field generating device 3a is positioned on the second side. Similarly, a second optical system 1b and second focussed light emitting device 2b are positioned on the second side while a second magnetic field generating device 3b is positioned on the first side. The magnetic field generating devices 3a and 3b are preferably permanent magnets and accordingly a first magnetic field generating device 4a and a second magnetic field generating device 4b may be provided. Movement devices 7a and 7b are also respectively provided.

Focussed light is irradiated onto the magneto-optical layer 5a through the focussed light emitting device 2a to accomplish writing and reading on the first magneto-optical layer 5a. Furthermore, during recording the perpendicular magnetism of the magneto-optical disk is reversed by the first magnetic field generating device 3a.

Focussed light is irradiated onto the magneto-optical layer 5b through the focussed light emitting device 2b to accomplish writing and reading on the second magneto-optical layer 5b. Furthermore, during recording the perpendicular magnetism of the magneto-optical disk is reversed by the second magnetic field generating device 3b.

Additionally, it is possible to conduct writing and reading on the first magneto-optical layer 5a, the second magneto-optical layer 5b or both sides simultaneously.

In order to prevent interference between the first magnetic field and the second magnetic field, an offset is maintained in the movement range of the respective focussed light emitting devices 2a and 2b.

THIRD EMBODIMENT

Figure 3A:
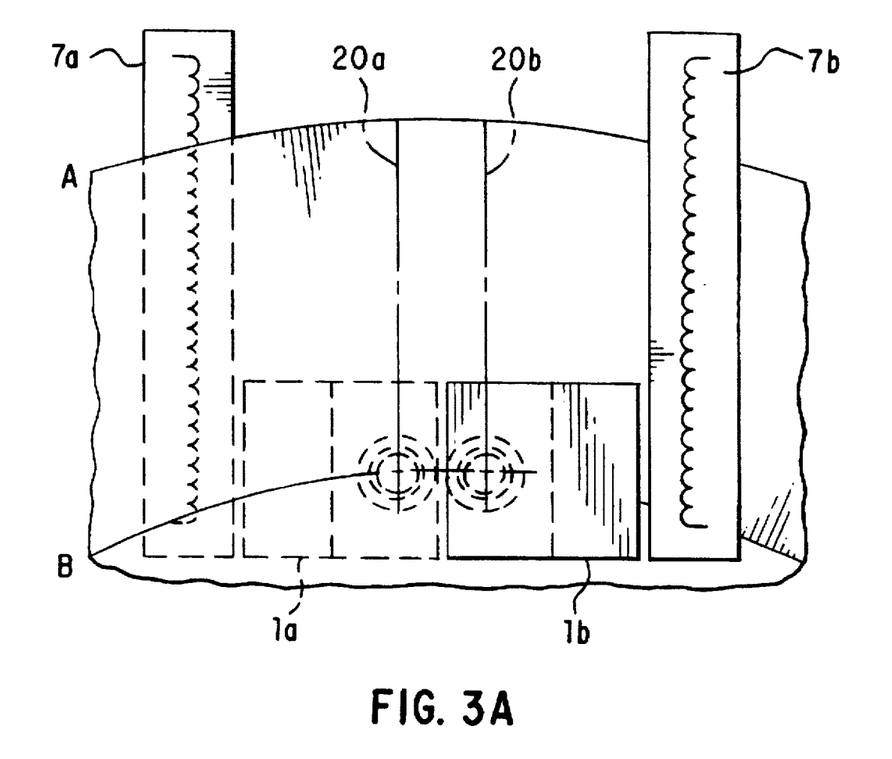
FIG. 3 is a vertical cross section of an magneto-optical disk drive device according to a third embodiment of the present invention.
Figure 3B:
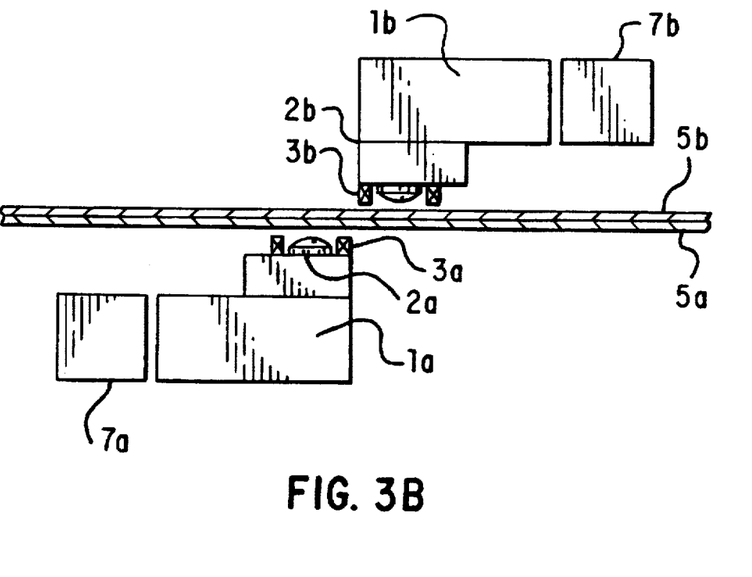

FIG. 3 is a cross-sectional diagram of yet another magneto-optical disk drive device. This device includes a first optical system 1a, a first focussed light emitting device 2a, a first magnetic field generating device 3a, a second optical system 1b, a second focussed light emitting device 2b and a second magnetic field generating device 3b. The first magnetic field generating device 3a is positioned surrounding the first focussed light emitting device 2a. The second magnetic field generating device 3b is positioned surrounding the second focussed light emitting device 2b. Movement devices 7a and 7b are similarly provided.

Focussed light is irradiated onto the magneto-optical layer 5a through the focussed light emitting device 2a to accomplish writing and reading on the first magneto-optical layer 5a. Furthermore, during recording the perpendicular magnetism of the magneto-optical disk is reversed by the first magnetic field generating device 3a.

Focussed light is irradiated onto the layer 5b through the focussed light emitting device 2b to accomplish writing and reading on the second magneto-optical layer 5b. Furthermore, during recording the perpendicular magnetism of the magneto-optical disk is reversed by the second magnetic field generating device 3b.

It is also possible to conduct writing and reading on the first layer 5a, the second layer 5b or both sides simultaneously.

In this embodiment, the magnetic field generating devices 3a and 3b are preferably electromagnets, although permanent magnets can be used especially when magnetic field reversing devices are also used.

In order to prevent interference between the first magnetic field and the second magnetic field, an offset is maintained in the movement range of the respective focussed light emitting devices 2a and 2b.

FOURTH EMBODIMENT

Figure 4A:
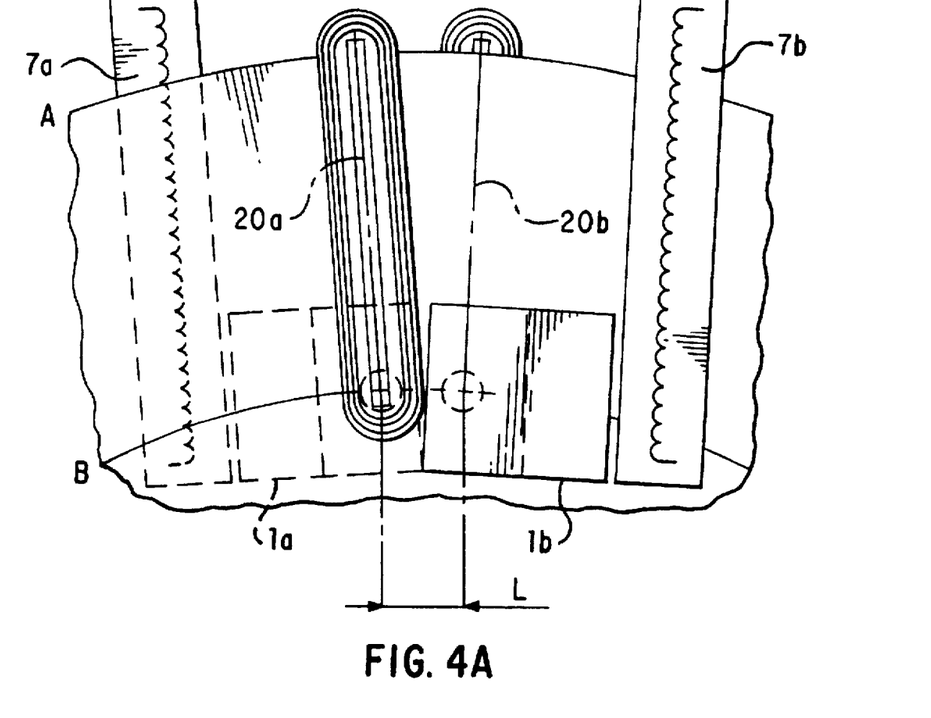
FIG. 4 is a vertical cross section of an magneto-optical disk drive device according to a fourth embodiment of the present invention.
Figure 4B:
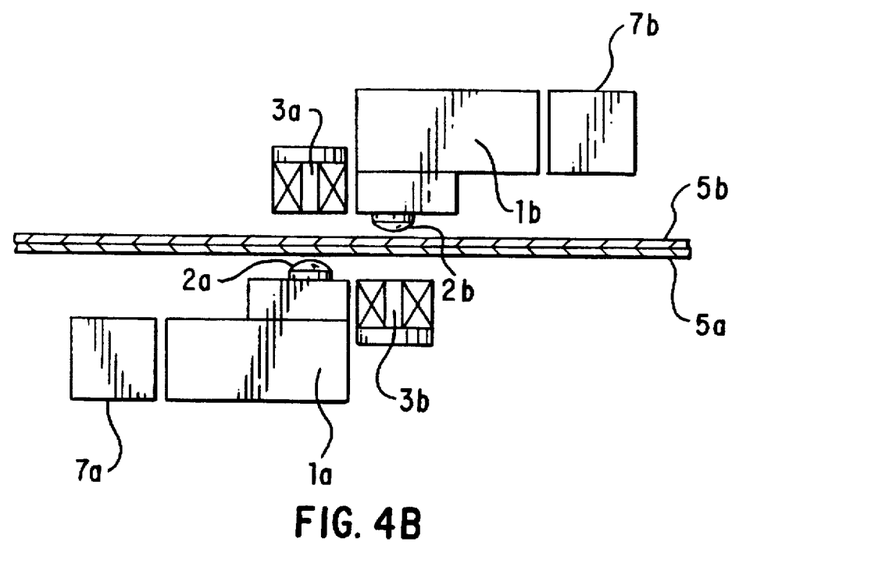

FIG. 4 is a cross-sectional diagram of a magneto-optical disk drive device. In this device, a first optical system 1a and a first focussed light emitting device 2a are positioned on a first side of the magneto-optical disk while a first magnetic field generating device 3a is positioned on the second side. Similarly, a second optical system 1b and a second focussed light emitting device 2b are positioned on the second side while a second magnetic field generating device 3b is on the first side. The magnetic field generating devices 3a and 3b are preferably electromagnets. Movement devices 7a and 7b are also provided.

Focussed light is irradiated onto the magneto-optical layer 5a through the focussed light emitting device 2a to accomplish writing and reading on the first magneto-optical layer 5a. Furthermore, during recording the perpendicular magnetism of the disk is reversed by the first magnetic field generating device 3a.

Focussed light is irradiated onto the magneto-optical layer 5b through the focussed light emitting device 2b to accomplish writing and reading on the second magneto-optical layer 5b. Furthermore, during recording the perpendicular magnetism of the disk is reversed by the second magnetic field generating device 3b.

It is also possible to accomplish writing and reading on the first layer 5a, the second layer 5b or both sides simultaneously.

In order to prevent interference between the first magnetic field and the second magnetic field, an offset is maintained in the movement range of the respective focussed light emitting devices 2a and 2b.

Furthermore, the tracks 20a and 20b of the light spots move in a radial direction between the outer radius A (the outermost peripheral position) and the inner radius B (the innermost peripheral position) while maintaining at least a minimum spacing L between one another.

FIFTH EMBODIMENT

Figure 5A:
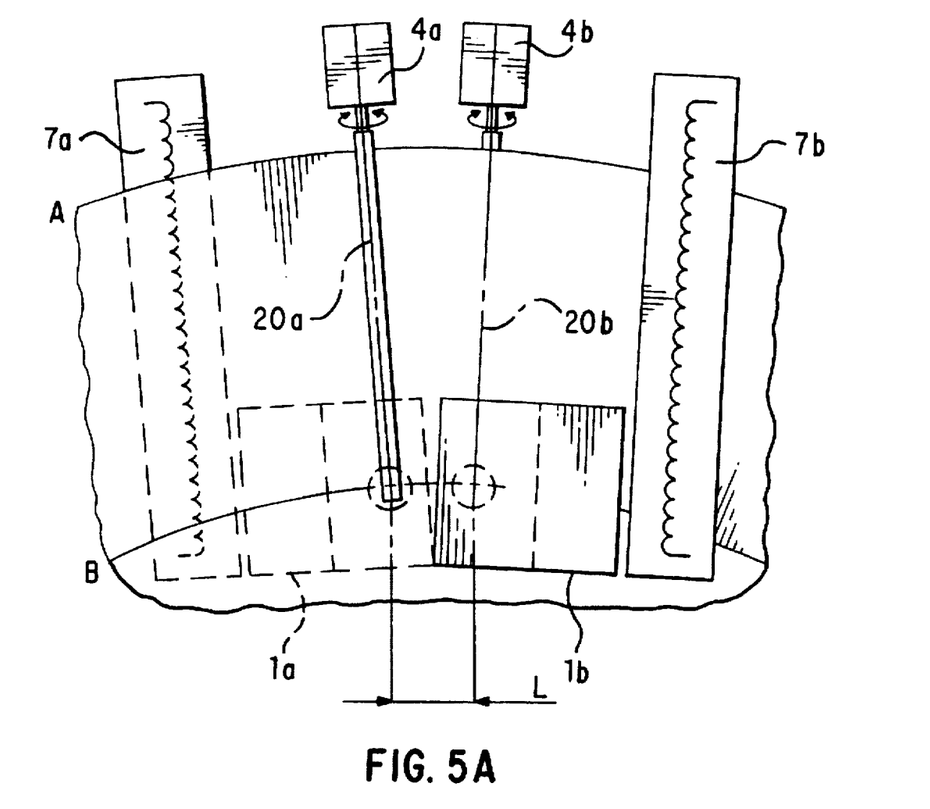
FIG. 5 is a vertical cross section of an magneto-optical disk drive device according to a fifth embodiment of the present invention.
Figure 5B:
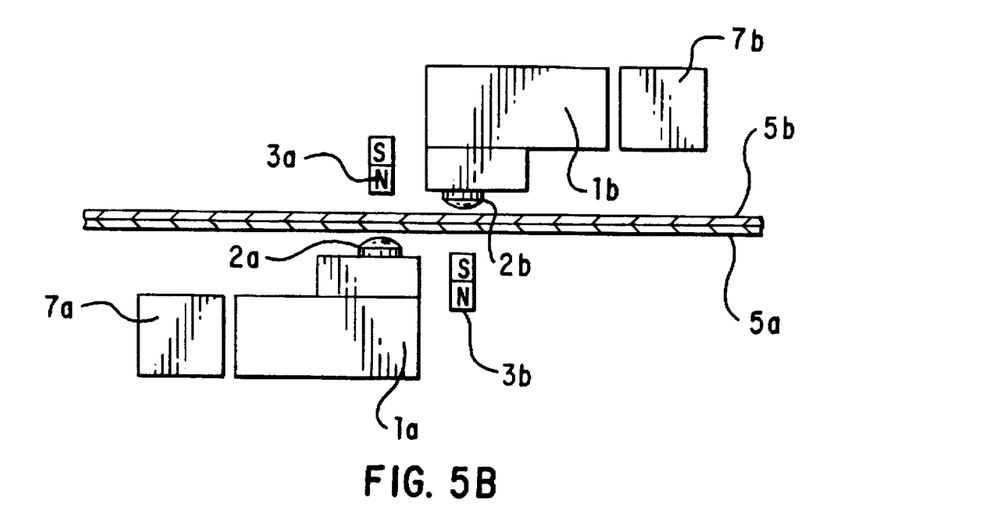

FIG. 5 is a cross-sectional diagram of still yet another embodiment of a magneto-optical disk drive device. In this device, a first optical system 1a and a first focussed light emitting device 2a are positioned on a first side of the disk while a first magnetic field generating device 3a is positioned on the second side. Similarly, a second optical system 1b and a second focussed light emitting device 2b are positioned on the second side while a second magnetic field generating device 3b is positioned on the first side. The magnetic field generating devices 3a and 3b are preferably permanent magnets. Movement devices 7a and 7b move the first and second focussed light emitting devices 2a and 2b as discussed above.

Focussed light is irradiated onto the magneto-optical layer 5a through the focussed light emitting device 2a to accomplish writing and reading on the first magneto-optical layer 5a of the disk. Furthermore, during recording the perpendicular magnetism of the disk is reversed by the first magnetic field generating device 3a.

Focussed light is irradiated onto the magneto-optical layer 5b through the focussed light emitting device 2b to accomplish writing and reading on the second magneto-optical layer 5b. Furthermore, during recording the perpendicular magnetism of the disk is reversed by the second magnetic field generating device 3b.

It is also possible to accomplish writing and recording on the first layer 5a, the second layer 5b or both sides simultaneously.

In order to prevent interference between the first magnetic field and the second magnetic field, an offset is maintained on the movement range of the respective focussed light emitting devices 2a and 2b.

Furthermore, the tracks 20a and 20b of the light spots move in a radial direction using movement devices 7a and 7b while maintaining a minimum spacing L between the respective optical systems.

SIXTH EMBODIMENT

Figure 6A:
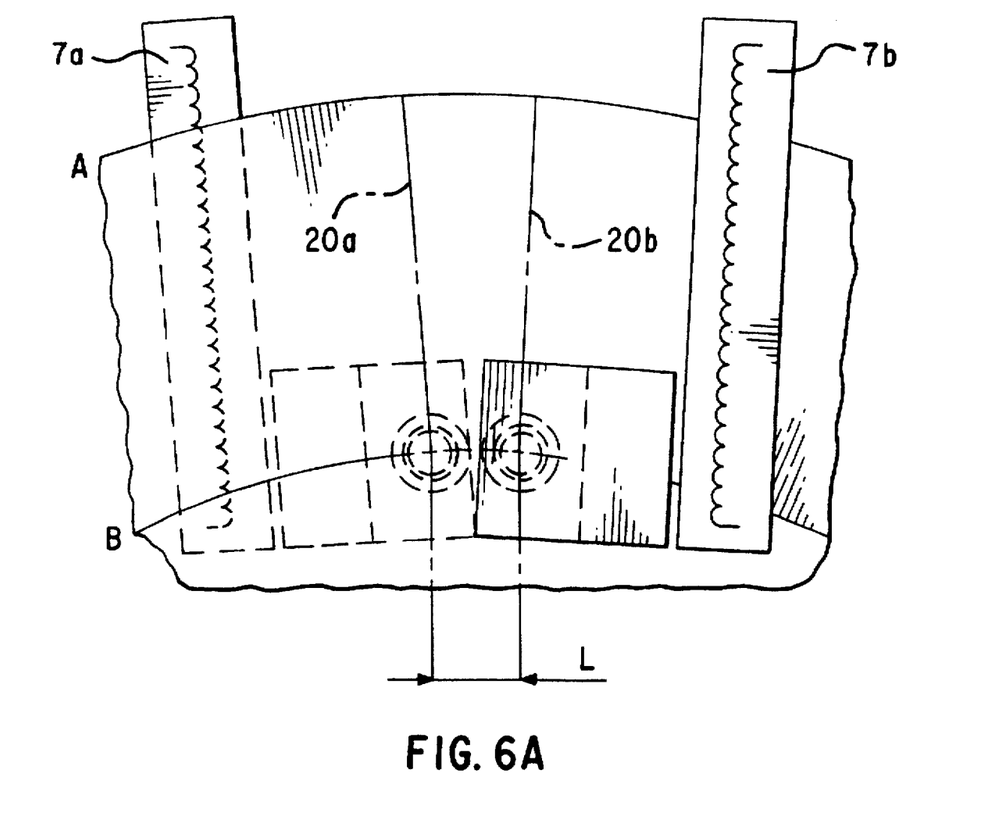
FIG. 6 is a vertical cross section of an magneto-optical disk drive device according to a sixth embodiment of the present invention.
Figure 6B:
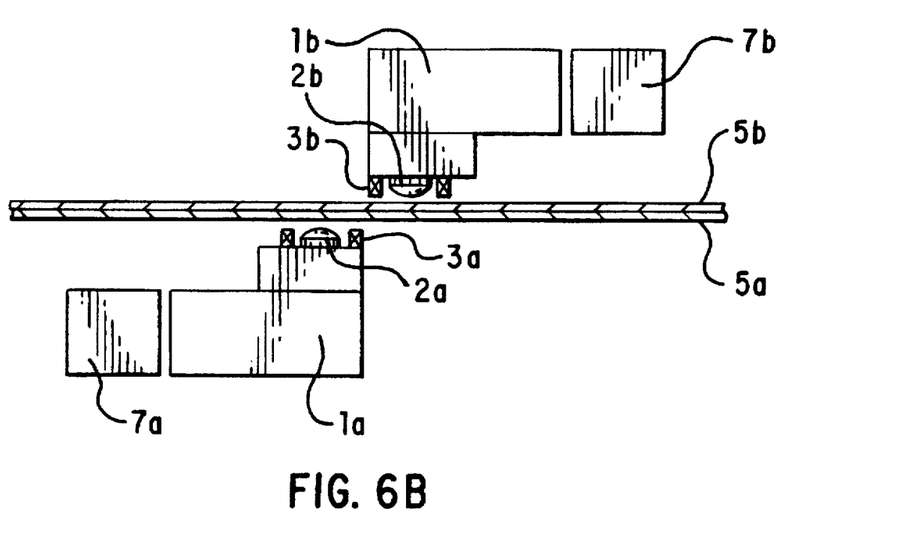

FIG. 6 is a cross-sectional diagram of another embodiment of a magneto-optical disk drive device. This device includes a first optical system 1a, a first focussed light emitting device 2a, a first magnetic field generating device 3a, a second optical system 1b, a second focussed light emitting device 2b and a second magnetic field generating device 3b. The first magnetic field generating device 3a is positioned surrounding the first focussed light emitting device 2a and the second magnetic field generating device 3b is positioned surrounding the second focussed light emitting device 2b. The magnetic field generating devices 3a and 3b are preferably electro-magnets although permanent magnets could also be used when a magnetic field reversing device is used. Movement devices 7a and 7b are similarly provided as in the other embodiments of this invention.

Focussed light is irradiated onto the magneto-optical layer 5a through the focussed light emitting device 2a to accomplish writing and reading on the first magneto-optical layer 5a. Furthermore, during recording the perpendicular magnetism of the disk is reversed by the first magnetic field generating device 3a.

Focussed light is irradiated onto the magneto-optical layer 5b through the focussed light emitting device 2b to accomplish writing and reading on the second magneto-optical layer 5b. Furthermore, during recording the perpendicular magnetism of the disk is reversed by the second magnetic field generating device 3b.

It is also possible to accomplish writing and reading on the first layer 5a, the second layer 5b or both sides simultaneously.

In order to prevent interference between the first magnetic field and the second magnetic field, an offset is maintained in the movement range of the respective focussed light emitting devices 2a and 2b.

Furthermore, the tracks 20a and 20b of the light spots move in a radial direction using the movement devices 7a and 7b while maintaining a minimum spacing L between the respective optical systems.

SEVENTH EMBODIMENT

Figure 8A:
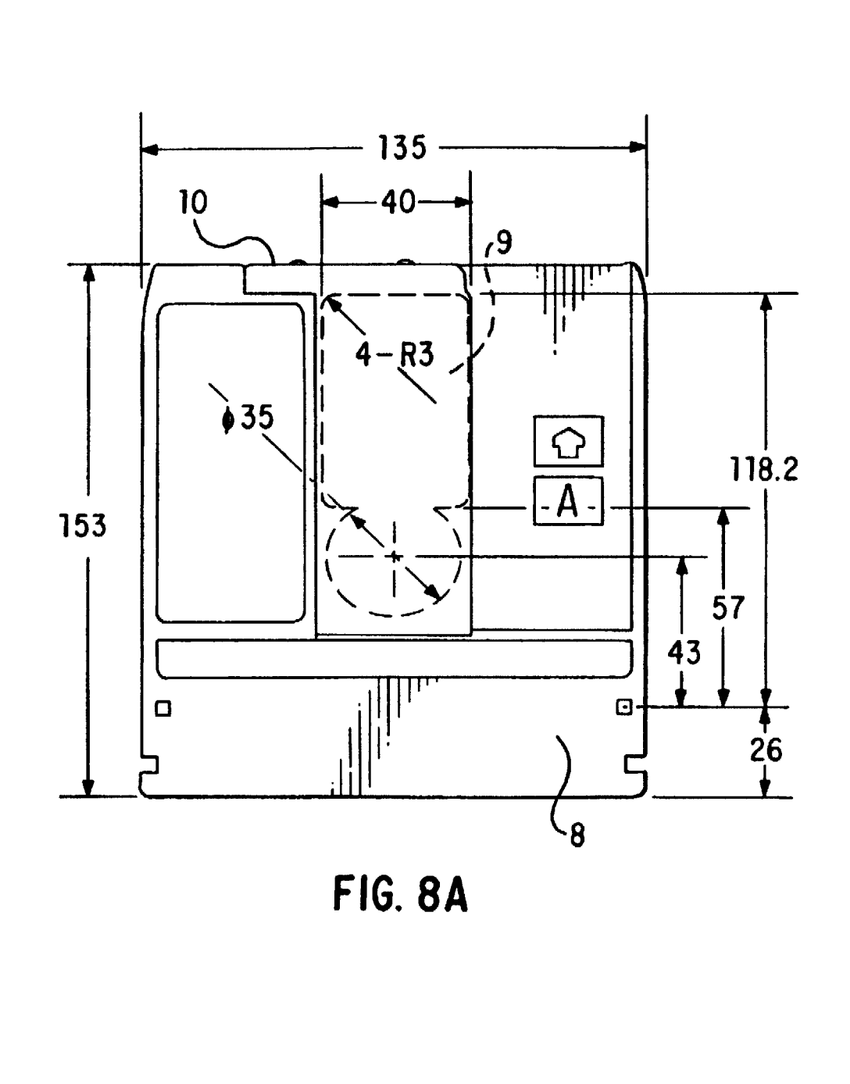
FIG. 8(a) is a plane view of an magneto-optical disk cartridge.
Figure 8B:
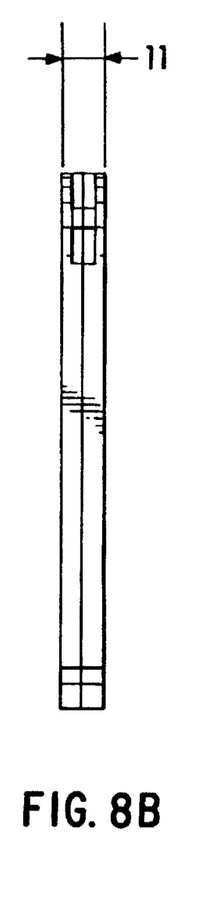
FIG. 8(b) is a side view of the magneto-optical disk cartridge of FIG. 8(a)

FIG. 8(a) is a plane view of a magneto-optical disk cartridge 8. FIG. 8(b) is a side view thereof.

Figure 9A:
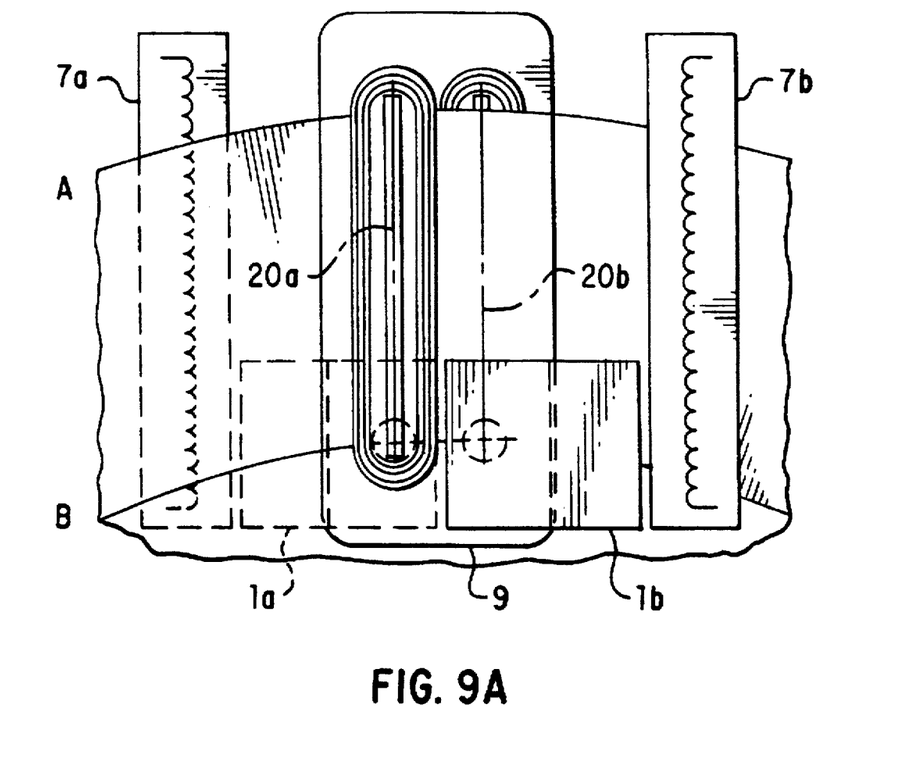
FIG. 9 is a cross section of an magneto-optical disk drive device according to a seventh embodiment of the present invention.
Figure 9B:
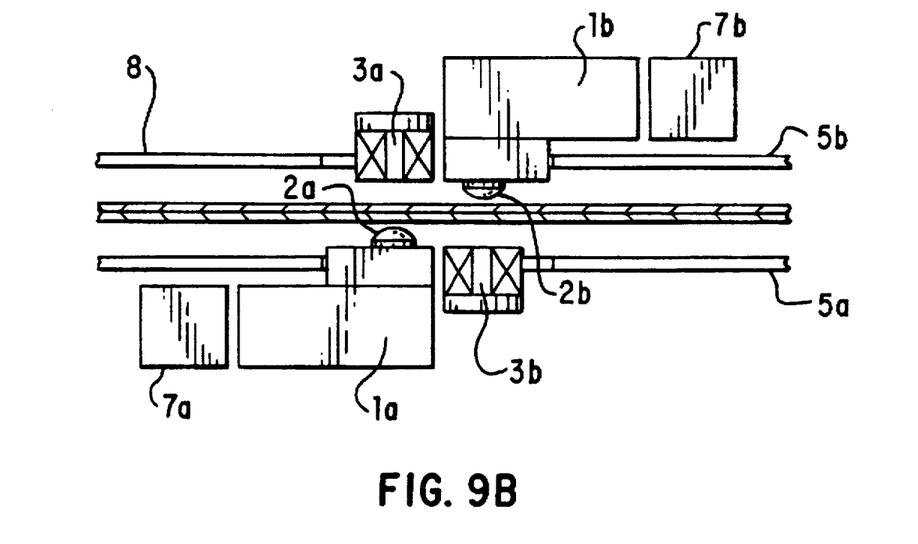

FIG. 9 is a cross-sectional diagram of a magneto-optical disk drive device of still yet another embodiment. With this device, a first optical system 1a and a first focussed light emitting device 2a are positioned on a first side of the magneto-optical disk while a first magnetic field generating device 3a is positioned on a second side. Similarly, a second optical system 1b and second focussed light emitting device 2b are positioned on the second side while a second magnetic field generating device 3b is on the first side. The magnetic field generating devices 3a and 3b are preferably electromagnets in this embodiment.

The focussed light emitting devices 2a and 2b and the magnetic field generating devices 3a and 3b are inserted through windows 9 in the cartridge 8.

Focussed light is irradiated onto the magneto-optical layer 5a through the focussed light emitting device 2a to accomplish writing and reading on the first magneto-optical layer 5a. Furthermore, during recording the perpendicular magnetism of the disk is reversed by the first magnetic field generating device 3a.

Focussed light is irradiated onto the magneto-optical layer 5b through the focussed light emitting device 2b to accomplish writing and reading on the second magneto-optical layer 5b. Furthermore, during recording the perpendicular magnetism of the disk is reversed by the second magnetic field generating device 3b.

It is also possible to conduct writing and reading on the first layer 5a, the second layer 5b or both sides simultaneously.

In order to prevent interference between the first magnetic field and the second magnetic field, an offset is maintained in the movement range of the respective focussed light emitting devices 2a and 2b.

The first and second focussed light emitting devices 2a and 2b are positioned so the first and second optical spots focus on the first and second sides in offset locations. Consequently, because the first and second optical spots do not effect each other, it is possible to simultaneously write and record from both the first and second sides. Through this, it is possible to realize a magneto-optical disk drive device having a simultaneous dual side access.

Furthermore, with the simultaneous dual side access, it is possible to boost the speed of data writing and reading to roughly double that of conventional devices.

In this way, it is possible to write and read simultaneously from both sides of a disk and thus increase the online capacity with certainty.

While the invention has been described with reference to specific embodiments, the description is merely illustrative and is not to be construed as limiting the scope of the claims.

Various modifications and variations may occur to those skilled in the art without departing from the spirit and scope of the claims.

What is claimed is:

1. A magneto-optical disk drive device for operation with a disk having a first side and a second side, the disk drive device comprising:
   a first light emitting device that emits light onto the first side;
   a first movement device communicating with said first light emitting device to move the first light emitting device in a radial direction relative to said disk;
   a first magnetic field generating device that reverses a perpendicular magnetism of the disk when the first light emitting device operates;
   a second light emitting device that emits light onto the second side in an offset position relative to the light emitted onto the first side;
   a second movement device communicating with said second light emitting device to move the second light emitting device in a radial direction relative to said disk; and
   a second magnetic field generating device that reverses a perpendicular magnetism of the disk when the second light emitting device operates, wherein said first light emitting device is capable of emitting light onto a magneto-optical layer on said first side of the disk for reading and writing and said second light emitting device is capable of emitting light onto a separate magneto-optical layer on said second side of the disk for reading and writing.

2. The device of claim 1, wherein the disk is housed in a cartridge having a first window for receiving the first light emitting device and a second window for receiving the second light emitting device.

3. The device of claim 1, wherein the first and second magnetic field generating devices each include an electromagnet.

4. The device of claim 3, wherein the electro-magnet of the first magnetic field generating device is positioned facing the second side of the disk and the first light emitting device is positioned facing the first side of the disk.

5. The device of claim 3, wherein the electro-magnet of the first magnetic field generating device substantially surrounds the first light emitting device facing the first side of the disk.

6. The device of claim 1, wherein the first and second magnetic field generating devices each include a permanent magnet.

7. The device of claim 6, wherein the permanent magnet of the first magnetic field generating device is positioned facing the second side of the disk and the first light emitting device is positioned facing the first side of the disk.

8. The device of claim 6, wherein the permanent magnet of the first magnetic field generating device substantially surrounds the first light emitting device facing the first side of the disk.

9. The device of claim 1, wherein the first and second movement devices maintain at least a preset minimum distance between a disk location where the second light emitting device emits light onto the second side and a disk location where the first light emitting device emits light onto the first side.

10. A magneto-optical disk drive device for operation with a disk having a first side and a second side, the disk drive device comprising:
    first light emitting means for emitting light onto the first side and for moving the light in a radial direction along the disk;
    second light emitting means for emitting light onto the second side in an offset position relative to the light emitted onto the first side and for moving the light in a radial direction along said disk;
    first magnetic field generating means for reversing a perpendicular magnetism on the first side of the disk when the first light emitting means is operating; and
    second magnetic field generating means for reversing a perpendicular magnetism on the second side of the disk when the second light emitting means is operating.

11. The device of claim 10, wherein the disk is housed in a cartridge having a first window for receiving the first light emitting means and a second window for receiving the second light emitting means.

12. The device of claim 10, wherein the first magnetic field generating means includes an electromagnet.

13. The device of claim 12, wherein the electro-magnet of the first magnetic field generating means is positioned facing the second side of the disk and the first light emitting means is positioned facing the first side of the disk.

14. The device of claim 12, wherein the electro-magnet of the first magnetic field generating means substantially surrounds the first light emitting means facing the first side of the disk.

15. The device of claim 10, wherein the first magnetic field generating means includes a permanent magnet.

16. The device of claim 15, wherein the permanent magnet of the first magnetic field generating means is positioned facing the second side of the disk and the first light emitting means is positioned facing the first side of the disk.

17. The device of claim 15, wherein the permanent magnet of the first magnetic field generating means substantially surrounds the first light emitting means facing the first side of the disk.

18. The device of claim 10, wherein the first and second light emitting means maintain at least a preset minimum distance between a disk location where the second light emitting means emits light onto the second side and a disk location where the first light emitting means emits light onto the first side.

* * * * *